United States Patent [19]
deHullu et al.

[11] Patent Number: 5,834,538
[45] Date of Patent: Nov. 10, 1998

[54] PRESSURE SENSITIVE ADHESIVES

[75] Inventors: Jacobus G. deHullu, SheerArendskerke; Dirk Kruythoff, Papendrecht; Willemien G. Salomons, Zwijndrecht; Adriana Veldhorst, Middelburg, all of Netherlands

[73] Assignee: Hercules Incorporated, Wilmington, Del.

[21] Appl. No.: 664,606

[22] Filed: Jun. 18, 1996

[51] Int. Cl.⁶ .............. C08L 1/28; C08L 3/04; C08L 5/12; C08L 5/04
[52] U.S. Cl. .............. 524/22; 524/22; 524/25; 524/28; 524/43; 524/44; 524/45; 524/46; 524/50; 524/55; 524/56; 524/271; 524/549; 524/555; 524/557; 524/558; 524/733; 524/734; 524/199; 524/207
[58] Field of Search ............ 524/45–271, 733, 524/734, 22, 25, 28, 43, 44, 46, 50, 55, 56, 549, 555, 557, 558; 526/199, 200

[56] References Cited

U.S. PATENT DOCUMENTS

| | | | |
|---|---|---|---|
| 3,779,960 | 12/1973 | Araki et al. | 524/734 |
| 3,801,519 | 4/1974 | Brodot | 524/733 |
| 3,928,262 | 12/1975 | Ono et al. | 524/44 |
| 3,975,570 | 8/1976 | Ono et al. | 428/355 |
| 4,503,184 | 3/1985 | Marongiu | 524/45 |
| 4,505,976 | 3/1985 | Doehnert et al. | 428/355 |
| 4,588,762 | 5/1986 | Mruk et al. | 524/45 |
| 4,612,345 | 9/1986 | Hess | 524/733 |
| 4,654,388 | 3/1987 | Lofgren | 524/271 |
| 4,659,771 | 4/1987 | Craig | 524/700 |
| 4,670,505 | 6/1987 | Craig | 524/704 |
| 4,801,643 | 1/1989 | Craig | 524/832 |
| 4,845,175 | 7/1989 | Lo | 526/200 |
| 4,868,238 | 9/1989 | Craig | 524/733 |
| 4,908,403 | 3/1990 | Spada et al. | 524/818 |
| 5,190,997 | 3/1993 | Lindemann et al. | 524/45 |
| 5,314,944 | 5/1994 | Chao | 524/501 |
| 5,358,998 | 10/1994 | Wendel et al. | 524/734 |

FOREIGN PATENT DOCUMENTS

| | | | |
|---|---|---|---|
| 215673 | 9/1987 | Japan | 524/45 |
| 31882 | 2/1989 | Japan | 524/45 |
| 1448008 | 12/1988 | Russian Federation | 524/45 |
| WO 96/14357 | 5/1996 | WIPO . | |

*Primary Examiner*—Peter A. Szekely

[57] ABSTRACT

A pressure sensitive adhesive(PSA) composition includes a latex system of an aqueous polymer dispersion derived from ethylenically-unsaturated monomers in the presence of a water soluble protective colloid. The PSA compositions are used in the manufacture of a variety of articles that are intended to be easily attachable to another substrate by the application of pressure alone.

20 Claims, No Drawings

5,834,538

PRESSURE SENSITIVE ADHESIVES

BACKGROUND OF THE INVENTION

1. Field of the Invention

This invention relates to a pressure sensitive adhesive (PSA) composition and its application. More specifically, this invention relates to a PSA composition including aqueous polymer dispersions derived from ethylenically-unsaturated monomers in the presence of a water soluble protective colloid and to its applications.

2. Background

Normally, tacky, pressure-sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources. Maintaining the requisite balance of such properties while improving one or more characteristics of such PSA's is both difficult and unpredictable. Any modification of adhesive compositions which improves one adhesive property may detrimentally affect one or more other desirable properties. For example, it is difficult to improve an adhesive's internal strength (cohesiveness and shear) without reducing one or more other desirable properties.

Polymers of olefinically unsaturated carboxylic acid ester monomers have received wide acceptance as PSA's because of the relatively good balance of properties they afford in many applications. Acrylic-based latices have found wide acceptance in the PSA industry because the adhering performance of the PSA based on acrylic emulsions is such that they can replace less environmentally friendly and more expensive solvent-based systems. However, the right combination of peel, tack, and shear alone does not guarantee success in the PSA market. The industry is looking for better mechanical stability and less foam tendency of the applied latices.

Prior to the present invention, water borne PSA's were not mechanically stable and/or tended to foam when they were being prepared. In industrial emulsion polymerization processes, surfactants are commonly used either alone or in combination with polymeric protective colloids. A drawback to this is that surfactants must be used at high levels in order to obtain shear stable latices which is not economical and may have adverse side effects. For example, the presence of surfactants in latex systems can have a negative effect on water-sensitivity and causes foaming of final products. In addition, at conventional use levels, surfactants do not impact sufficient mechanical stability to the final products.

It is known in the prior art that the presence of protective colloids as co-stabilizers, such as hydroxyethylcellulose (HEC) and poly (vinyl alcohol)(PVOH), in emulsion polymerization of ethylenically-unsaturated monomers, including vinyl monomers, vinyl monomers with an acrylic monomer such as acrylic esters, methacrylic esters or mixtures thereof, provides latices of submicron particle size with improved rheological, stability, and performance characteristics.

In emulsion polymerization processes of monomers comprising acrylics or styrene either alone or in combination with other monomers, it is not always possible to use protective colloids such as cellulosics or PVOH, as co-stabilizers. When prior art protective colloids are used in an acrylic- or styrene-based latex systems, a high degree of flocculation occurs which manifests itself in a lack of mechanical stability. This flocculation results from the high tendency of the protective colloid to be incorporated directly into the reacting polymer chain. This phenomenon is commonly known as grafting.

It should be understood that grafting in and of itself is not to be totally eliminated. A minor amount of grafting does not cause flocculation; further, it improves stability of latex systems, as has been known for a long time for the vinyl acetate copolymer latices. It is the combination of excessive grafting and the possibility of interparticle bridging that are the causes for coagulation. Interparticle bridging is not only determined by the amount of grafted material or particle size alone, but is also dependent on the amount of water soluble polymer present in the water phase, the molecular weight of the protective colloid, solids content, etc.

In any event, depending on the particular latex system, the lack of mechanical stability may be overcome by using high levels of surfactant alone or in combination with protective colloid. For example, in vinyl acetate-based systems, high levels of protective colloid are used in combination with surfactant, while in acrylic-based systems, high levels of surfactant are used alone. However, latices prepared with such high levels of surfactants have the performance problems described above.

Thus, a need exists in the PSA industry to overcome the inherent drawbacks in prior art latex systems related to the use of high levels of surfactant or prior art protective colloids.

U.S. Ser. No. 08/553,007, filed Nov. 3, 1995, entitled "Cellulose Ethers in Emulsion Polymerization Dispersions" discloses the techniques for producing the latices of the instant invention.

U.S. Pat. Nos. 3,928,262 and 3,975,570 disclose PSA compositions comprising alkyl acrylate and carboxymethylcellulose that posses excellent adhesiveness when adhered to an object as well as improved breathability. U.S. Pat. No. 4,908,403 discloses pressure-sensitive acrylic adhesive that uses protective colloids (col. 13).

Another approach for polymerizing acrylic monomer systems, disclosed in LO, U.S. Pat. No. 4,845,175, is to use 0.02 to 2.0% by weight of a hydrophobically modified hydroxyethylcellulose as a protective colloid.

Yet another approach for polymerizing acrylic monomer systems, disclosed in CRAIG '771, U.S. Pat. No. 4,659,771, is to use, in addition to a protective colloid, from about 0.1% to 5% by weight of a substantially completely water-soluble conjugated unsaturated monomer such as furoic acid, styrene sulfonic acid, and metal salts, amine salts, ammonium salts and quaternary salts of rosin and acids having 4 to 36 carbon atoms.

SUMMARY OF THE INVENTION

The present invention is directed to a process for preparing a PSA composition comprising an aqueous emulsion latex system comprising:

(a) a polymer of at least one ethylenically unsaturated monomer selected from the group consisting of acrylic acid, methacrylic acid, butyl acrylate, methyl methacrylate, 2-ethylhexyl acrylate, acrylic esters, styrene, vinyl ethers, vinyl and vinylidene halides, N-vinyl pyrrolidone, ethylene, $C_3$ or greater alpha-olefins, allyl amines, allyl esters of saturated monocarboxylic acids and amides thereof, propylene, 1-butene, 1-pentene, 1-hexene, 1-decene, allyl amines, ally acetate, allyl propionate, allyl lactate, their amides, mixtures thereof, 1,3 butadiene, 1,3 pentadiene, 1,4 pentadiene, cyclopentadiene, hexadiene isomers, and (b) an amount effective for stabilizing the latex system, of a water soluble protective colloid with a molecular weight of less than about 75,000, selected from the group consisting of carboxymethyl cellulose and derivatives thereof, having a carboxyl degree of substitution lower limit of about 0.7, hydroxyethylcellulose, ethyl hydroxyethylcellulose, methyl cellulose, methyl hydroxypropylcellulose, hydroxypropylcellulose, poly(acrylic acid) and alkali metal salts thereof, ethoxylated starch derivatives, sodium another alkali metal polyacrylates, water soluble starch glue, gelatin, water soluble alginates, casein, agar, natural and synthetic gums, partially and fully hydrolyzed poly (vinyl alcohol), polyacrylamide, poly (vinyl pyrrolidone), poly (methyl vinyl ether-maleic anhydride), gelatin and casein.

DETAILED DESCRIPTION OF THE INVENTION

It has been unexpectedly found that the use of low molecular weight protective colloid in emulsion polymerization of ethylenically-unsaturated monomer produces excellent mechanical stability of the resultant polymer and that these polymers are useful in PSA's. The combination of the latices with tackifiers used in this field results in unexpectedly high shear strength of the adhesive. The upper limit of the weight average (Mw) molecular weight of the protective colloid is about 75,000, preferably about 50,000, and most preferably about 20,000. The lower limit of the molecular weight of the protective colloid is about 5,000, preferably about 10,000 and most preferably about 15,000.

The present invention is particularly useful for acrylic or styrene latex systems. As noted above, with regard to prior art acrylic or styrene-based latex systems, the use of commercially desirable levels of protective colloid is not practical because of high levels of flocculation occurring. The use of high levels of surfactant to overcome this problem can have a negative effect on water sensitivity and causes foaming of final products. In addition, at conventional use levels, surfactants do not impact sufficient mechanical stability to the final products. It has unexpectedly been found that the use of low molecular weight protective colloid, in acrylic- or styrene-based latex systems, permits reduction in the level of—or even the omission of—surfactant. The final products have generally been found to have less water sensitivity, less foaming, and greater mechanical stability properties as compared to the prior art systems. Mechanical stability can manifest itself in greater shelf life. Additionally, in PSAs, maintaining the requisite balance of tackiness, adhesion, cohesion, and other properties associated with PSAs is easily accomplished.

The preferred polysaccharide protective colloid is a water-soluble cellulose ether which has been derivatized with ethylene oxide, methyl chloride, propylene oxide, monochloracetic acid, etc., or mixtures thereof. Particularly preferred are carboxymethylcellulose (CMC) and derivatives thereof, having a carboxyl degree of substitution (DS) of about 0.7 to about 2.9, more preferably about 0.7 to about 1.5, still more preferably about 1.0 to about 1.4. Suitable carboxymethycellulose derivatives include methyl carboxymethycellulose, ethyl carboxymethylcellulose, hydroxyethyl carboxymethylcellulose, hydroxypropyl carboxymethylcellulose, methoxethyl carboxymethylcellulose, ethoxyethyl carboxymethylcellulose, and diethyl aminocarboxymethylcellulose.

Hydroxyethylcellulose (HEC) can also be used, the hydroxyethyl molar substitution (MS) preferably ranging from about 1.6 to bout 4.0, more preferably about 1.8 to about 3.5, still more preferably between about 1.8 and about 2.9.

Yet additionally, hydrophobically modified cellulose ethers can be used. Suitable hydrophobically modified cellulose ethers are cellulose ethers which are further substituted with a hydrocarbon having from 4 to 25 carbon atoms, in an amount by weight of the hydrophobically modified cellulose ether from about 0.1% to about 3.0%, more preferably about 0.1% to about 2.0%.

A preferred hydrophobically modified cellulose ether is hydrophobically modified hydroxyethylcellulose (HMHEC). Hydrophobically modified hydroxyethylcellulose useful in the practice of this invention is a hydroxyethylcellulose which is further substituted with a hydrocarbon having from 4 to 25 carbon atoms, in an amount by weight of the hydrophobically modified hydroxyethylcellulose from about 0.1% to about 3.0%, more preferably about 0.1% to about 2.0%. The hydroxyethyl MS of the HMHEC lies preferably in the range of about 2.9 to about 4.0, more preferably about 2.9 to about 3.5.

Other cellulose ethers, for example, that can be used in this invention as a protective colloid are ethyl hydroxyethylcellulose (EHEC), methylcellulose(MC), methyl hydroxypropylcellulose (MHPC), and hydroxypropylcellulose (HPC).

Other polysaccharides and materials that can be used as protective colloids in the present invention are ethoxylated starch derivatives, partially and fully hydrolyzed polyvinyl alcohol, polyacrylic acid, alkali metal (potassium, sodium, etc.) polyacrylates, polyacrylamide, poly (methyl vinyl ether-maleic anhydride), poly (vinyl pyrrolidone), water-soluble starch glue, gelatin, water soluble alginates, casein, agar, and natural and synthetic gums.

Protective colloid is preferably employed in an amount effective for stabilization of the latex system of the invention. In this context, an effective amount is the amount which serves to stabilize the latex system during the aqueous emulsion polymerization and after completion of the polymerization.

Particularly, the protective colloid concentration in the emulsion polymerization process of the present invention can be varied over a wide range, with the upper limit being determined only to be economical and practical considerations based on what properties are desired in the final product. It is preferred that the upper limit be about 5.0%, more preferably 3.5%, and most preferably about 2.5%, by weight based on the total ethylenically unsaturated monomer content in the reaction mass. The preferred lower limit is about 0.005%. A more preferred lower limit is about 0.05, with about 0.1%, by weight, based on the total weight of the ethylenically unsaturated monomer content, being the more preferred lower limit.

The protective colloid of the invention can be used either alone or in combination with other protective colloids or surfactants. For example, the CMC derivative can be used as a single stabilizer or in combination with one or more surfactants. An example of CMC as used in this invention is available under the trademark "Ambergum" water-soluble polymers, types 1221 and 3021, marketed by Aqualon Company, Wilmington, Del. A suitable hydrophobically modified hydroxyethylcellulose is available under the trademark "Natrosol Plus," marketed by Hercules Incorporated, Wilmington, Del.

Also, in accordance with this invention, the monomers that are used in this invention are at least one ethylenically unsaturated monomer such as vinyl esters or ethers, styrenes, and others. The acrylates that are used in this invention are acrylic acid, methacrylic acid, butyl acrylate, methyl methacrylate, and other acrylate or methacrylate esters.

In general, any ethylenically unsaturated monomer, which optionally may be cyclic, which can be polymerized by free radical initiation can be used in the practice of this invention. Preferred ethylenically unsaturated monomers include those having up to 23 carbons.

Examples of suitable monomers include vinyl esters, vinyl ethers, vinyl and vinylidene halides, N-vinyl pyrrolidone, ethylene, $C_3$, or greater alpha-olefins, allyl amines, allyl esters of saturated monocarboxylic acids, and amides thereof and dienes and derivatives thereof.

Suitable vinyl esters include aliphatic vinyl esters, such as vinyl formate, vinyl acetate, vinyl propionate, vinyl butyrate, vinyl isobutyl rate, vinyl valerate, vinyl caproate and vinyl versatate.

Typically vinyl ethers include methyl vinyl ether, ethyl vinyl ether and n-butylvinyl ether.

Suitable $C_3$ or greater alpha-olefins include propylene, 1-butene, 1-pentene, cyclopentene, 1-hexene, cyclohexene and 1-decene.

Allyl amine and N-substituted allyl amines are examples of typical allyl amines.

Suitable dienes are butadiene, cyclopentadiene, and dicyclopentadiene.

Suitable allyl esters of saturated monocaraboxylic acids may include allyl acetate, allyl propionate and allyl lactates, and their amides, among others.

The polymers of the invention can be prepared from one or more of the ethylenically unsaturated monomers. In this regard, it is noted that by the term "polymer" it is also meant homopolymers, and copolymers that are polymerized with two or more different monomers.

For acrylic and styrene-based latices, low molecular weight CMC is preferred. For the vinyl acetate-acrylate systems, low molecular weight HMHEC is used preferentially, but also low molecular weight HEC and low molecular weight CMC can be used. When acrylic acid, or methacrylic acid is used in the polymerization, the use level preferably is about 0.005% to about 2%—more preferably, about 0.05% to about 1%—by weight based on the total ethylenically unsaturated monomer content.

Polymers of the invention with relatively high glass transition temperatures -, e.g., about 50° C. to about 150° C.—can be characterized as "hard"; those with relatively low glass transition temperatures -, e.g., about–100° C. to about–3° C.—can be characterized as "soft." A factor affecting the degree of hardness and softness is the identity of the ethylenically unsaturated monomers which are employed.

Different ethylenically unsaturated monomers contribute to hardness or softness in different degrees, and are thusly known as "hard" and "soft" monomers. The relative hardness and softness of different monomers are known in the art. The degree of hardness or softness of a polymer is accordingly affected by the hardness or softness of the monomers comprising the polymers, and by the relative ratios of these monomers.

When making a copolymer latex system, the ratios of "hard" to "soft" monomer are chosen so that a continuous latex film is formed at use temperature. In PSA applications, latices are commonly used with a high amount of soft monomer. Up to 100% of the monomer content could be of "soft" origin. Styrene-acrylics can be made in the range containing from about 0.005% to about 70% by weight styrene in the formed copolymer. Vinyl-acrylates can be made in the ratio range of about 1:1 to about 10:1, preferably about 7:3 to about 9:1, by weight of vinylacetate/acrylate monomer.

Anionic, cationic, nonionic, and amphoteric surfactants and mixtures thereof known in the art may be used in the practice of this invention. Suitable surfactants include polyglycol ethers, sulfonated paraffin hydrocarbons, higher alkyl sulfates such as lauryl sulfate, alkali metal salts and fatty acids such as sodium stearate and sodium oleate, sulfuric acid esters of fatty alcohols, ethoxylated $C_{4-50}$ alkyl phenols and their sulfonation products, such as nonylphenol ethoxylate with 4–50—more preferably, 10–20—ethylene oxide units, ethoxylated $C_{4-50}$ alkanols and their sulfonation products, and also sulfosuccinic acid esters such as sodium dioctylsulfocsuccinate; these surfactants or emulsifiers are optional and are not always required, but when they are used, they are present in amounts usually of from 0.1 to 5.0%, preferably 0.1 to 2.0%, by weight, based on the total amount of the ethylenically unsaturated monomers present in the process.

Any known methods of emulsion polymerization may be used, including batch, semi-batch, or continuous and thermal or redox techniques. Semi-batch monomer addition with either batch or continuous addition of the initiator or catalyst is preferred. The polymerization can also be carried out under high shear, meaning that, for example, a loop-reactor can be used for performing the reaction. Preferably, an amount of from about 0% to about 40%—more preferably about 1% to about 25%, and most preferably from bout 5% to about 15%—by weight of the ethylenically unsaturated monomer or monomers is added in the initial charge to the reactor. Also as a matter of preference, an amount of from about 0% to about 60%—more preferably, about 50% to 60%—by weight of the initiator is added in the initial charge to the reactor. The continuous addition of any reaction ingredient or ingredients is generally done over a period of from about 2 to about 5 hours. The batch or delayed initiator or catalyst addition may be used, although these variations are not necessary for the success of this invention.

In general, the monomers are polymerized by aqueous emulsion techniques at from about 20° C. to about 120° C., preferably from about 45° C. to about 95° C., in the presence of a free radical polymerization initiator, particularly a water-soluble peroxide, e.g., hydrogen peroxide, persulfates such as potassium, sodium and ammonium persulfates or, in some cases, perborates. Other methods known in the art may also be used to polymerize monomers, such as, for example, by using redox polymerization catalyst systems, such as potassium persulfate and sodium bisulfite. The initiator is used at a concentration of 0.2 to 2.0% by weight based on the weight of the monomer(s), preferably in an amount of 0.3–1.0%.

The resulting product of the invention is a latex system, including particles of the thusly prepared polymer dispersed as a discontinuous phase in an aqueous continuous phase, and also including the protective colloid. Latex particle size and particle size distribution can significantly influence latex physical properties which affect application of the latex to a backing material. The indicated particles preferably have an average size in the range of from 0.05 to 2 microns depending on the type of PSA, backing material, and desired properties. Similarly, latex viscosity can limit latex use in adhesive article manufacture due to the influence of viscosity on adhesive distribution, solids content (of the latex) and wetting of the adhesive article backing.

The suitability of PSA compositions is influenced primarily by the tackiness of the composition. Therefore, the main component is the tacky adhesive latex system. The tackiness and shear strength of the PSA can be modified by controlling the latex system. For example, by controlling the molecular weight of the polymer as well as the ingredients in the latex, this will enable the PSA to be modified to control the desired characteristics. Other factors that influence the suitability of PSAs are the ease of manufacturing of both the adhesive and the articles containing the adhesive, and environmental and personnel safety hazards. The dispersion of the present invention, therefore, must adequately wet the backing of an article to assure adequate adhesive distribution, coverage, and bonding to the backing.

The latex system of the present invention has excellent shear stability. Consistent with the previous discussion herein, it may be employed in latex PSA compositions. These PSA compositions preferably further include at least one tackifier, wetting agent, defoamer, and preservative; yet additional components conventional for latex PSA formulations, including thickeners, can be employed.

The use of solvents (other than water) is becoming more and more undesirable because of the cost of solvents as well as the expense and hazards involved in controlling solvent vapors. Yet in certain instances, small amounts of solvents must be used in the aqueous system of the present invention in order to control certain properties.

All parts and percentages of polymer and tackifier used in this specification are by dry weight unless otherwise indicated.

The invention is illustrated by the following Examples, which are provided for the purpose of representation, and are not to be construed as limiting the scope of the invention.

EXAMPLE 1

Water-Based Pressure Sensitive Adhesive (PSA) Using Butylacrylate Latex Stabilized With Low Molecular Weight CMC (Invention)

A butylacrylate latex stabilized with low molecular weight CMC was used in a PSA formulation. The PSA consisted of 70% of latex, 30% of tackifier resin dispersion, and 0.6% (wet) of Lumiten® I-RA product (dioctylsulfosuccinate, marketed by BASF). The resin dispersion is based on rosin ester with a softening point of 70° C. (Tacolyn® 3179 product, marketed by Hercules Incorporated).

The latex composition and stabilization of the latex are set forth in Table 1, infra.

The pressure-sensitive adhesive evaluation is presented in Table 2, infra.

This Example shows good shear adhesion of a PSA formulation using the latex of the invention.

EXAMPLE 2

Water-Based PSA Using Butylacrylate Latex Stabilized With Low Molecular Weight CMC (Invention)

A butylacrylate latex stabilized with low molecular weight CMC was used in a PSA formulation. The PSA was composed of 70% of latex, 30% of tackifier resin dispersion, and 0.6wt % (wet) of Lumiten® I-RA product. The resin dispersion is based on rosin ester (Tacolyn® 3179 product, marketed by Hercules).

The latex composition and stabilization of the latex is set forth in Table 1. The latex used in this Example was the same latex used in Example 1. The PSA formulation was also exactly the same.

The results demonstrated good reproducibility of the PSA results when a different batch of latex was used. The PSA evaluation is presented in Table 2, infra.

EXAMPLE A

Water-Based PSA Using Butylacrylate Latex Stabilized With Surfactants (Comparison)

The same adhesive formulation as used as in Examples 1 and 2 was used. The latex used in this Example case was a purely surfactant stabilized latex with exactly the same monomer composition as the lattices in Example 1 and 2. The results are shown in Tables 1 and 2.

This Example demonstrated superior shear adhesion for the lattices stabilized with low molecular weight CMC, in comparison to purely surfactant stabilized latex.

EXAMPLE 3

Water-Based PSA Using Butylacrylate Latex Stabilized With Low/Average Molecular Weight CMC (Invention)

A butylacrylate latex stabilized with low molecular weight CMC was used in a PSA formulation. The monomer composition differs from that in Examples 1, 2, and 3 in the amount of soft monomer used. The latex in this Example contained 95 wt. % of Butylacrylate and has, therefore, a lower glass transition temperature than the latex used in Examples 1, 2, and 3. The PSA was composed of 70% of latex, 30% of tackifier resin dispersion, and 0.6 wt. % (wet) of Lumiten® I-RA. The resin dispersion is based on the rosin ester, Tacolyn® 3179 product.

The results in PSA showed that the Ambergum® stabilized dispersions have superior cohesive strength in comparison to surfactant stabilized or commercial latices as demonstrated in comparative Examples B, C and D.

EXAMPLE 4

Water-Based PSA Using Butylacrylate Latex Stabilized With Low Molecular (Mw) CMC (Invention)

A Butylacrylate latex stabilized with low molecular weight CMC was used in a PSA formulation. The concentration of Ambergum® 3021 material in the latex was 2% of active material by weight of total monomer. The monomer composition of this latex was equal to that in Example 3. The PSA was composed of 70% of latex, 30% of tackifier resin dispersion, and 0.6 wt. % (wet) of Lumiten® I-RA product. The resin dispersion was based on Tacolyn® 3179 rosin ester.

The results in PSA showed that the Ambergum® stabilized dispersions have superior cohesive strength in comparison to surfactant stabilized or commercial lattices of comparative Examples B, C, and D.

EXAMPLE B

Water-Based PSA Using A Commercial Butylacrylate Latex (DL 322, Marketed By DOW Chemical Company) (Comparison)

A commercial butylacrylate latex (DL 322) was used in a PSA formulation that was composed of 70% of latex, 30% of tackifier resin dispersion, and 0.6 wt. % (wet) of Lumiten® I-RA product. The resin dispersion was based on Tacolyn® 3179 rosin ester.

EXAMPLE C

Water-Based PSA Using A Commercial Butylacrylate Latex (Primal EP 5560F Product, Marketed By Rohm & Haas) (Comparison)

A commercial butylacrylate latex (Primal EP 5560F) was used in a PSA formulation that was composed of 70% of latex, 30% of tackifier resin dispersion and 0.6 wt. % (wet) of Lumiten® I-RA product. The resin dispersion was based on Tacolyn® 3179 rosin ester.

EXAMPLE D

Water-Based PSA Using A Commercial Butylacrylate Latex (Acronal DS 3434X, Marketed By BASF) (Comparison)

A commercial butylacrylate latex (Acronal DS 3434X) was used in a PSA formulation that was composed of 70% of latex, 30% of tackifier resin dispersion, and 0.6 wt. % (wet) of Lumiten® I-RA product. The resin dispersion was based on Tacolyn® 3179 rosin ester.

EXAMPLE 5

Water-Based PSA Using Butylacrylate Latex Stabilized With Low Molecular Weight CMC (Invention)

The same adhesive formulation was used as in Example 3 with the exception of the tackifier used. In this Example, Tacolyn® 64 material was used as the tackifier resin. Tacolyn® 64 material is a dispersion of hydrogenated rosin ester with a softening point of 60° C. The latex used in the Example was exactly the same as the one used in Example 3.

This Example showed good compatibility of Ambergum® 3021 stabilized latices with various tackifiers. Again, an extremely high cohesive strength was obtained for the PSA.

EXAMPLE 6

Water-Based PSA Using Butylacrylate Latex Stabilized With Low Molecular Weight CMC (Invention)

The same adhesive formulation as used in Example 3 with the exception of the tackifier used. In this Example, Tacolyn® 1070 material was used as the tackifier resin. Tacolyn® 1070 material is a dispersion of aromatic modified five Carbon (C5) resin. The latex used in this Example was the same as the one used in Example 3.

This Example showed good compatibility of Ambergum® 3021 stabilized latices with various tackifiers. Again, an extremely high cohesive strength was obtained for the PSA.

EXAMPLE 7

Water-Based PSA Using Ethylhexylacrylate Latex Stabilized With Low Molecular Weight CMC (Invention)

An ethylhexylacrylate latex stabilized with ultra low molecular weight CMC was used in a PSA formulation that was composed of 70% of latex, 30% of tackifier resin dispersion and 0. wt. % (wet) of Lumiten® I-RA product. The resin dispersion was based on stabilized Tacolyn® 2178 rosin acid. In Table 4, the latex composition is set forth; in Table 5, the properties of the PSA are given.

This Example showed the good compatibility of Ambergum® 3021 stabilized lattices with various tackifiers and better performance compared to commercial latices (see Examples E and F).

EXAMPLE E

Water-Based PSA Using A Commercial Ethylhexylacrylate Latex (Acronal® V 205)

A commercial ethylhexylacrylate latex (Acronal® V 205, marketed by BASF) was used in a PSA formulation that was composed of 70% latex, 30% of tackifier resin dispersion with the resin dispersion being based on stabilized Tacolyn® 2178 rosin acid, and 0.6 wt. % (wet) of Lumiten® I-RA product.

In Table 5, the properties of the PSA are presented.

EXAMPLE F

Water-Based PSA Using A Commercial Ethylhexylacrylate Latex (Acron® V 220)

A commercial ethylhexylacrylate latex (Acronal® V 220, marketed by BASF) was used in a PSA formulation that was composed of 70% of latex, 30% of tackifier resin dispersion with the resin dispersion being based on Tacolyn® 2178 stabilized rosin acid, and 0.6 wt. % (wet) of Lumiten® I-RA product.

In Table 5, the properties of the PSA are given.

EXAMPLE 8

Water-Based PSA Using Ethylhexylacrylate Latex Stabilized With Low Molecular Weight CMC (Invention)

An ethylhexylacrylate latex stabilized with ultra low molecular weight CMC was used in a PSA formulation that was composed of 60%, 70%, and 80% of latex and thus 20%, 30%, and 40% of tackifier resin dispersion. The resin dispersion was based on Tacolyn® 2178 rosin acid. In the adhesive formulation, 0.6 wt. % (wet) of Lumiten® I-RA product was used. In Table 4, the latex composition is given: the latex used is the same as the latex used Example 7.

In Table 6, the properties of the PSA are presented.

This Example showed in combination with Examples 9, 10, and 11, the good compatibility of Ambergum® 3021 stabilized latices with various tackifiers. A high adhesion was obtained for all three levels of tackifier used.

EXAMPLE 9

Water-Based PSA Using Ethylhexylacrylate Latex Stabilized With Low Molecular Weight CMC (Invention)

An ethylhexylacrylate latex stabilized with ultra low molecular weight CMC was used in a PSA formulation that was composed of 60%, 70%, and 80% of latex and thus 20%, 30%, and 40% of tackifier resin dispersion. The resin dispersion was based on modified hydrocarbon resin (HERCULES MBG 185 product, which has a softening point of 75° C., marketed by Hercules BV). In the adhesive formulation, 0.6 wt. % (wet) of Lumiten® I-RA product (marketed by BASF) is used as well.

In Table 4, the latex composition is given; the latex used is the same as the latex mentioned in Example 11.

In Table 6, the properties of the PSA are given.

EXAMPLE 10

Water-Based PSA Using Ethylhexylacrylate Latex Stabilized With Low Molecular Weight CMC (Invention)

An ethylhexylacrylate latex stabilized with ultra low molecular weight CMC was used in a PSA formulation. The PSA consisted of 60%, 70% or 80% of latex, and thus 20%, 30% or 40% of tackifier resin dispersion. The resin dispersion was based on rosin ester (Tacolyn® 3179). In the adhesive formulation, 0.6 wt. % (wet) of Lumiten® I-RA was used as well.

In Table 4, the latex composition is given; the latex used is a duplication of the latex mentioned in Example 11.

In Table 6, the properties of the PSA are presented.

EXAMPLE 11

Water-Based PSA Using Ethylhexylacrylate Latex Stabilized With Low Molecular Weight CMC (Invention)

An ethylhexylacrylate latex stabilized with ultra low molecular weight CMC was used in a PSA formulation. The PSA was composed of 60%, 70%, and 80% of latex, and thus 20%, 30%, and 40% of tackifier resin dispersion. The resin dispersion was based on modified hydrocarbon resin (HERCULES DC950330, which has a softening point of 60° C., marketed by Hercules BV).

In the adhesive formulation 0.6 wt. % (wet)of Lumiten® I-RA product was used.

In Table 4, the latex composition is given; the latex used is the same as the latex used in Example 11.

In Table 6, the properties of the PSA are given.

This Example showed in combination with Examples 14, 15, and 16 the good compatibility of Ambergum® 3021 stabilized latices with various tackifiers.

TABLE 1

Composition and characteristics of the lattices used

| Monomer Composition Of The Latex | | Stabilizer Use In The Latex |
|---|---|---|
| Ex 1. BA/MMA/MAA | (85/10/5) | Ambergum ® 3021 (1% by weight on monomer) |
| Ex 2. BA/MMA/MAA | (85/10/5) | Ambergum ® 3021 (1% by weight on monomer) |
| Ex 3. BA/MMA/MAA | (85/10/5) | dioctylsulfosuccinate (0.2%), sulfonated nonylphenolethoxylate, 9 EO (0.14%), sulfonated nonylphenolethoxylate, 30 EO (0.28%) |
| Ex 4. BA/MMA | (95/5) | Ambergum ® 3021 (1% by weight on monomer) |
| Ex 5. BA/MAA | (95/5) | Ambergum ® 3021 (2% by weight on monomer) |

BA = butylacrylate
MMA = methylmethacrylate
MAA = methacrylic acid
The ratio of monomer is given by weight.
All concentrations of stabilizers are of active material by weight on monomer

TABLE 2

PSA properties at 23° C. of the formulations

| | Stabilization of the Latex | Peel to PE* (N/25 mm) | Peel to cardboard (N/25 mm) | Shear to steel, 1 kg (min) | Loop tack PE (N/25 mm) | |
|---|---|---|---|---|---|---|
| Ex. 1 | Ambergum ® 3021 (1%) | 19 PS** | 6 | >10000 | 5 | SS*** |
| Ex. 2 | Ambergum ® 3021 (1%) | 19 PS | 7 | >10000 | 6 | SS |
| Ex. A | surfactants | 22 PS | 14 | 822 | 5 | SS |
| Ex. 3 | Ambergum ® 3021 (1%) | 19 PS | 4 | 2890 | 12 | |
| Ex. 4 | Ambergum ® 3021 (2%) | 18 PS | 5 | 3420 | 13 | |
| Ex. B | commercial latex | 20 | 3 | >2000 | 10 | |
| Ex. C | commercial latex | 20 PS | 5 | 1000 | 12 | |
| Ex. D | commercial latex | 20 PS | 4 | 700 | 13 | |

*PE means polyethylene
**PS means paper strain
***SS means slip stick

TABLE 3

Properties of PSA's at 23° C. using different tackifiers

| | Tackifier | Peel to PE (N/25 mm) | Peel to cardboard (N/25 mm) | Shear to steel, 1 kg (min) | Loop tack PE (N/25 mm) |
|---|---|---|---|---|---|
| Ex 3 | Tacolyn ® 3179 | 19 | 4 | 2890 | 12 |
| Ex 5 | Tacolyn ® 64 | 16 | 4 | >10000 | 7 |
| Ex 6 | Tacolyn ® 1070 | 8 | 3 | >10000 | 5 |

TABLE 4

Composition and Characteristics of the Lattices used

| | Monomer Composition | Stabilizer used in the Latex | Solids Content (%) |
|---|---|---|---|
| Ex. 7 | EHA/MAA (95/5) | Ambergum ® 3021 (1%) Dicyclohexylsulfosuccinate (1%) | 47.6 |

TABLE 5

PSA Properties of the formulations

| | Stabilization of the Latex | Peel to PE (N/25 mm) | Peel to Cardboard (N/25 mm) | Shear to steel, 1 kg (min) | Loop Tack PE (N/25 mm) |
|---|---|---|---|---|---|
| Ex. 7 | Ambergum ® 3021 | 8 | 4 | 1700 | 6 |
| Ex. E | Commercial | 8 | 4 | 600 | 6 |
| Ex. F | Commercial | 7 | 4 | 400 | 5 |

TABLE 6

PSA Properties of Various Formulations
Tackifier dry weight % in PSA

|  | Tackifier | % of Tackifier in PSA | Peel to PE (N/25 mm) | Peel to Cardboard (N/25 mm) | Shear to steel, 1 kg (min) | Loop Tack PE (N/25 mm) |
|---|---|---|---|---|---|---|
| Ex. 8 | Tacolyn ® 2178 | 20 | 6 | 6 | 1400 | 9 |
| Ex. 8 | Tacolyn ® 2178 | 30 | 8 | 4 | 1700 | 6 |
| Ex. 8 | Tacolyn ® 2178 | 40 | 8 | 4 | 1900 | 7 |
| Ex. 9 | Hercules MGB 185 | 20 | 9 | 7 | 600 | 9 |
| Ex. 9 | Hercules MGB 185 | 30 | 25 | 18 | 700 | 10 |
| Ex. 9 | Hercules MGB 185 | 40 | 25 | 15 | 800 | 12 |
| Ex. 10 | Tacolyn ® 3179 | 20 | 8 | 7 | 800 | 9 |
| Ex. 10 | Tacolyn ® 3179 | 30 | 15 | 8 | 400 | 9 |
| Ex. 10 | Tacolyn ® 3179 | 40 | 21 | 17 | 400 | 16 |
| Ex. 11 | Hercules ® DC950330 | 20 | 7 | 6 | 200 | 8 |
| Ex. 11 | Hercules ® DC950330 | 30 | 7 | 4 | 300 | 9 |
| Ex. 11 | Hercules ® DC950330 | 40 | 20 | 14 | 400 | 14 |

TABLE 7

| Latex[1] | Monomer | Stabilizing system | Pn1 (nm)[2] | Pn2 (nm)[3] | Foam (mm)[4] |
|---|---|---|---|---|---|
| Ex. 1 | BA/MMA/MAA (85/10/5) | Ambergum ® 3021 (1% w/w on monomer) | 430 | 350 | 16 |
| Ex. 2 | BA/MMA/MAA (85/10/5) | Ambergum ® 3021 (1% w/w on monomer) | 460 | 380 | 15 |
| Ex. 3 | BA/MMA/MAA (85/10/5) | surfactants | 110 | see footnote[5] | 36 |
| DL322 | BA based | surfactants | <100 | <100 | 35 |
| Primal EP 5560F | BA based | surfactants | 520 | 550 | 65 |
| Ex. 4 | EHA/MMA (95/5) | 2% Ambergum ® 3021 + 1% dicyclohexyl-suffosucc (% w/w on monomer) | 450 | 460 | 15 |
| Acronal V205 | EHA based | surfactants | 400 | 2000 | 3 |
| Acronal DS 3464 | EHA based | surfactants | 500 | 1450 | 14 |

[1])Ex. labeled lattices were produced at Hercules A & D Laboratory. DL322 - Dow   Primal EP 5560F - Rohm and Haas   Acronal V205 - BASF   Acronal DS 3464 - BASF
[2])(Pn1) Particle size as measured with a Joyce Loebl Disc Centrifuge before shearing the latex, measured in nanometers.
[3])(Pn2) Particle size as measure with a Joyce Loebl Disc Centrifuge after shearing the latex, which has been diluted with demi-water (1/1) for 5 minutes at high level with a Waring Blender.
[4])Height of foam layer when test applied as described under (3).
[5])Latex coagulated upon shearing.

Latices were prepared according to the formulations in Table 1. The polymerizations were carried out in a 2-liter glass reaction vessel, which was equipped with a thermocouple, a reflux condenser, a monomer inlet, an initiator inlet and a half-moon shaped stirrer. The colloid, buffer and, if relevant, surfactant were simultaneously dissolved in the make up water. After standing overnight, the temperature was raised to 85° C. by means of a water bath. Next, 40% of the initiator was added in 30 seconds, whereafter the metering of the monomer and the rest of the initiator was started. The monomer flow was increased to 5%/10 minutes. After 40 minutes, monomer flow as increased to 60%/10 minutes and kept at this level during reaction time. The monomer and the initiator were added over a 220 minute period with a plunger pump and a peristaltic pump, respectively. The reaction temperature was kept at 85° C. After addition of the monomer and 90% of the initiator, the temperature was kept at 85° C. for an additional hour. During this time of digestion, the remaining 10% of an initiator was added. Thereafter, the lattices were cooled down to room temperature.

EXAMPLE 12

This Example clearly reveals the combination of superior mechanical stability together with low foam tendency for Ambergum® stabilized butylacrylate based lattices in comparison with commercial lattices used in this application.

TABLE 8

| Component | Ex 1 (g) | Ex 2 (g) | Ex A (g) | Ex 8 (g) |
|---|---|---|---|---|
| Water | 398.5 | 398.5 | 410 | 500 |
| Ambergum ® D-3021[1] | 1 | 16.6 | 16.6 | 33 |
| NaHCO3 | 1.6 | 1.6 | 1.6 | 2.0 |
| KS208 | 1.5 | 1.5 | 1.5 | 2.0 |
| BA | 425 | 425 | 425 | |
| MMA | 50 | 50 | 50 | 25 |
| MAA | 25 | 25 | 25 | |
| 2-EHA | | | | 275 |
| Disponil ® SUS IC 875[2] | | | 0.6 | |
| Fenopon ® EP 100[3] | | 1.2 | | |
| Fenopon ® EP 120[3] | | 2.4 | | |
| Aerosol ® A196[4] | | | | 5.2 |

[1])Marketed by Hercules Incorporated.
[2])Marketed by Henkel Company.
[3])Marketed by Rhone Poulenc Company.
[4])Marketed by Cytec Company.

What is claimed:

1. A pressure sensitive adhesive composition comprising aqueous emulsion latex system comprising:
   a) a polymer of at least one ethylenically unsaturated monomer that is either hard or soft selected from the group consisting of acrylic acid, methacrylic acid, butyl acrylate, methyl methacrylate, 2-ethylhexyl acrylate, acrylic esters, styrene, vinyl ethers, vinyl and vinylidene halides, N-vinyl pyrrolidone, ethylene, $C_3$ or greater alpha-olefins, allyl amines, allyl esters of saturated monocarboxylic acids and amides thereof, propylene, 1-butene, 1-pentene, 1-hexene, 1-decene, allyl amines, allyl acetate, allyl propionate, allyl lactate, their amides, mixtures thereof, 1,3 butadiene, 1,3 pentadiene, 1,4 pentadiene, cyclopentadiene, hexadiene isomers and mixtures thereof and
   b) an amount effective for stabilizing the latex system, of water soluble protective colloid with a weight average molecular weight of less than about 75,000, selected from the group consisting of carboxymethylcellulose, having a carboxyl degree of substitution lower limit of about 0.7, hydroxyethylcellulose, ethyl hydroxyethylcellulose, methylcellulose, methyl hydroxypropylcellulose, carboxymethylhydroxyethylcellulose, hydroxypropylcellulose, poly (acrylic acid) and alkali metal salts thereof, ethoxylated starch, sodium and other alkali metal polyacrylates, water-soluble starch glue, gelatin, water-soluble alginates, casein, agar, natural and synthetic gums, partially and fully hydrolyzed poly (vinyl alcohol), polyacrylamide, poly (vinyl pyrrolidone), poly (methyl vinyl ether-maleic anhydride), guar gelatin, and casein wherein the amount of soft monomer in the latex polymer is high with the ratio of hard to soft monomers in the latex polymers being chosen so that a continuous latex film is formed at use temperature and the latex polymer has a glass transition temperature of about–100° C. to about–3° C. and a shear to steel, 1 kg, value higher than 2000 minutes in the absence of surfactant.

2. The pressure sensitive adhesive composition of claim 1, wherein at least one other adhesive ingredient is present.

3. The pressure sensitive adhesive composition of claim 2 wherein at least one other adhesive ingredient is a tackifier.

4. The pressure sensitive adhesive composition of claim 3 wherein the tackifier is selected from the group consisting of rosin esters, rosin acid, hydrocarbon resin, resin dispersions based on rosin ester, resin dispersions based on rosin acid, resin dispersions based on hydrocarbon resin, and resins dispersions of the above-mentioned resins emulsified with rosin soap instead of conventional surfactants.

5. The pressure sensitive adhesive composition of claim 2, wherein at least one of the members selected from the group consisting of wetting agent, defoamer, thickener, solvent and preservative is also present.

6. The pressure sensitive adhesive composition of claim 1, wherein the polymer has been polymerized by aqueous emulsion polymerization in the presence of the water-soluble protective colloid.

7. The pressure sensitive adhesive composition of claim 1, further comprising from about 0.01 to about 4.0%, by weight based on the total ethylenically unsaturated monomer content, of a surfactant.

8. The pressure sensitive adhesive composition claim 1, wherein the protective colloid has a molecular weight upper limit of about 50,000.

9. The pressure sensitive adhesive composition of claim 1, wherein the protective colloid has a molecular weight upper limit of about 20,000.

10. The pressure sensitive adhesive composition of claim 1, wherein the protective colloid comprises a cellulose ether selected from group consisting of hydroxyethylcellulose, ethylhydroxyethylcellulose, carboxymethylcellulose having a carboxyl degree of substitution lower limit of about 0.7, methylcellulose, methylhydroxypropylcellulose, hydroxypropylcellulose, and mixtures thereof.

11. The pressure sensitive adhesive composition of claim 10, wherein the cellulose ether comprises carboxymethylcellulose with a carboxyl degree of substitution of about 0.7–2.9.

12. The pressure sensitive adhesive composition of claim 1, wherein the cellulose ether comprises carboxymethylhydroxyethylcellulose with a hydroxyethyl molar substitution between 0.2 and 2.0 and carboxymethyl molar substitution between 0.1 and 1.0.

13. The pressure sensitive adhesive composition of claim 1, wherein at least one ethylenically unsaturated monomer comprises a member selected from the group consisting of acrylic acid, methacrylic acid, butyl acrylate, methyl methacrylate, 2-ethylheyl acrylate, acrylic esters, styrene, 1,3 butadiene, 1,3 pentadiene, 1,4 pentadiene, cyclopentadiene, hexadiene isomers, and mixtures thereof.

14. The pressure sensitive adhesive composition of claim 1, wherein at least one ethylenically unsaturated monomer comprises a member selected from the group consisting of vinyl esters, vinyl ethers, vinyl and vinylidene halides, N-vinyl pyrrolidone, ethylene, $C_3$ or greater alpha olefins, allyl amines, allyl esters of saturated monocarboxylic acids and amides thereof, and mixtures thereof.

15. The pressure sensitive adhesive of claim 1, wherein up to 100% of the monomer content is soft.

16. The pressure sensitive adhesive of claim 1, wherein the latex polymer is styrene-acrylic polymers having from about 0.005% to about 70% by weight of styrene.

17. The pressure sensitive adhesive of claim 1, wherein the latex polymer is vinylacetate-acrylate polymers where the ratio of vinylacetate to acrylate is in the range of from about 1:1 to about 10:1 by weight.

18. The pressure sensitive adhesive of claim 17, wherein the ratio of vinyl acetate to acrylate is in the range of from about 7:3 to about 9:1 by weight.

19. The pressure sensitive adhesive of claim 1, wherein the latex polymer is comprised of butylacrylate, methylmethacrylate, and methacrylic acid.

20. The pressure sensitive adhesive of claim 1, wherein the latex polymer is comprised of ethylhexylacrylate and methacrylic acid.

* * * * *